H. A. WOODHEAD.
FIXTURE.
APPLICATION FILED JAN. 6, 1914.
1,097,496.  Patented May 19, 1914.
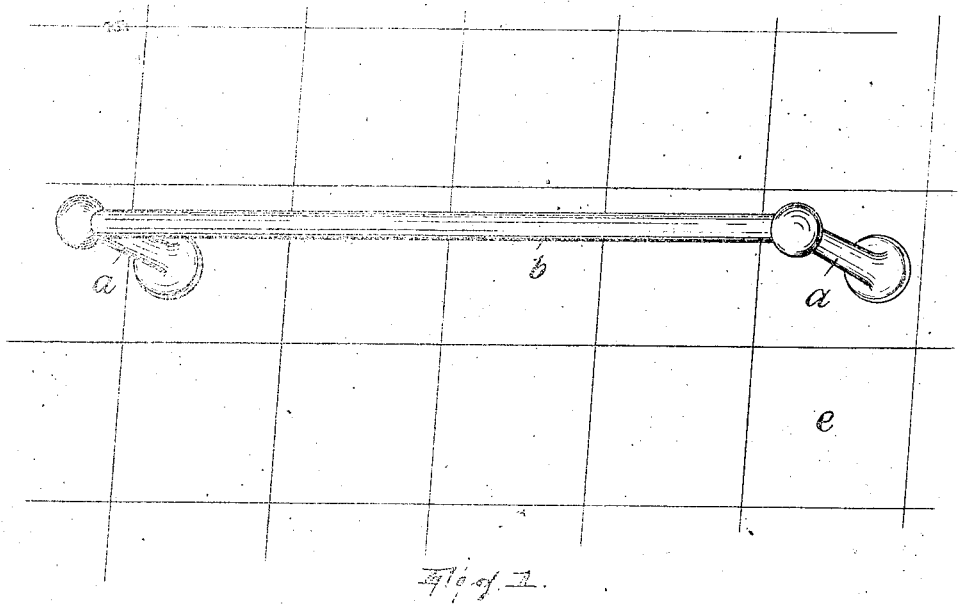
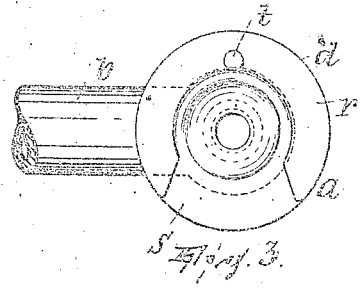
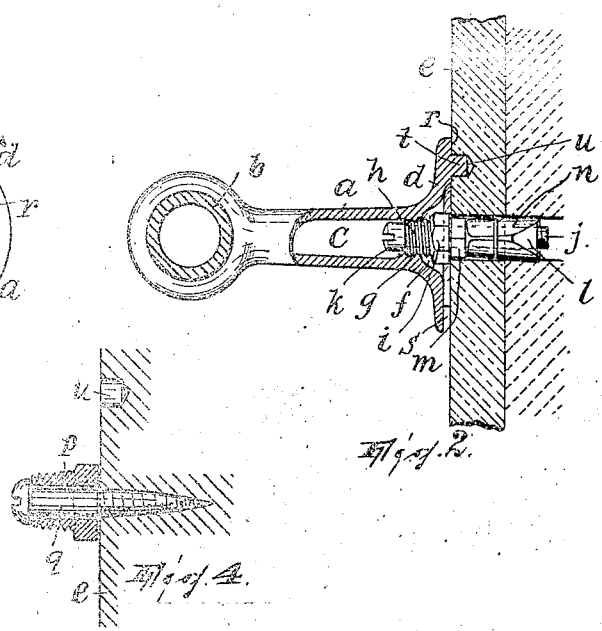
WITNESSES
INVENTOR
Henry A. Woodhead,
BY
ATTORNEY

UNITED STATES PATENT OFFICE.

HENRY A. WOODHEAD, OF WORTENDYKE, NEW JERSEY.

FIXTURE.

1,097,496. Specification of Letters Patent. Patented May 19, 1914.

Application filed January 6, 1914. Serial No. 810,550.

*To all whom it may concern:*

Be it known that I, HENRY A. WOODHEAD, a citizen of the United States, residing at Wortendyke, in the county of Bergen and State of New Jersey, have invented certain new and useful Improvements in Fixtures, of which the following is a specification.

The object of this invention is to provide a fixture for bath-room and similar uses that may be secured to a wall or similar surface in a way at once concealing the securing means and rendering the securing peculiarly capable of resisting influences tending to loosen the fixture.

According to this invention the fixture is held in place by a rotatable coupling member held swiveled on a suitable axial support fixed in the wall or the like and having a male and female screw thread engagement with the fixture, and the fixture further has a hollow base adapted to bear against said wall and to conceal said member and formed with a restricted opening affording access to said member to turn the same.

In the accompanying drawing, Figure 1 is a perspective view of a towel rack, hand rail or the like, comprising the improved fixture; Fig. 2 shows the fixture secured to a wall, the latter and a portion of the fixture proper appearing in section; Fig. 3 is a rear elevation of the fixture proper; and, Fig. 4 illustrates a modification.

The fixture proper $a$ selected by way of example for illustration in the drawing is one of the posts which form with the rod $b$ a towel rack or rail of common form. As usual it is cored out, as at $c$, and is provided with a flaring base $d$ designed to rest flatwise against the wall $e$ or the surface of any other body to which the post is to be secured. The base $d$ has a concavity $f$ formed on the side thereof which bears against the wall $e$ and around the bore $c$.

The bore $c$ of the post is formed with the female screw thread $g$ and engaged therewith is the male screw thread of a coupling member $h$ which may have a faceted head $i$ or any other desired means to receive a wrench or similar implement for turning the member $h$.

Member $h$ is swiveled on the screw $j$ having a head $k$ for retaining said member in place and as shown in Fig. 2 forming a part of an expansion bolt of well-known type, $l$ being the wedge-nut of such expansion bolt, $m$ the stop-nut and $n$ the cheeks thereof; or, as shown in Fig. 4, such member, designated $p$, may be swiveled on a plain headed screw $q$ driven directly into the wall.

The base is formed so as substantially to conceal the coupling member. That is to say, the major part of the distance around the concavity $c$ is provided with a bearing surface $r$ which bears squarely against and conforms closely to the surface upon which the fixture is secured; for the remaining part it is cut away, as at $s$, to produce a narrow-width slot (see Figs. 2 and 3), arranged at the under side of the base. I preferably also provide means to interlock the fixture against turning when securing the same in place; thus, $t$ is a stud formed on the base and adapted to enter a hole $u$ drilled in the wall before applying the fixture.

To secure the fixture in place the axial support (the expansion bolt or the screw $p$) is first fixed in the wall, with the coupling member in place thereon, freely rotatable. Having then drilled the hole $u$, the fixture proper is placed over the coupling member so that it enters the threaded part of the bore $c$. With a wrench or the like capable of entering the slot $s$, the coupling member is then turned until it draws the fixture base firmly against the wall, rotation of the fixture proper at this time being prevented by having previously engaged the stud $t$ in hole $u$. It should be remarked that in applying the fixture the side of the same having the slot should be underneath so as to conceal the slot.

Having thus fully described my invention, what I claim as new and desire to secure by Letters Patent is:—

1. In combination, a fixture, an axial support adapted to be fixed in the body affording the surface against which the fixture is to be secured, and a rotatable coupling member held swiveled in said support, the fixture and said member having male and female screw thread engagement with each other and the fixture having a hollow base adapted to bear against said surface and concealing said member and formed with a restricted opening affording access to said member to turn the same, substantially as described.

2. In combination, a fixture having a concave base adapted to bear against the surface to which the fixture is secured with the concavity of said base opening toward said surface, an axial support adapted to be fixed in the body affording such surface, and a rotatable coupling member held swiveled on said support and projecting into the concavity of said base, the fixture and said member having male and female screw thread engagement with each other and the base having a narrow-width slot leading to its concavity and coextensive in length with but a relatively limited part of the exterior circumference of said base and affording access to said member to turn the same, substantially as described.

In testimony whereof I affix my signature in presence of two witnesses.

HENRY A. WOODHEAD.

Witnesses:
 JOHN W. STEWARD,
 WM. D. BELL.